United States Patent
Levran (10) Patent No.: US 9,771,736 B1
(45) Date of Patent: Sep. 26, 2017

(54) STACKABLE, MODULAR BARRICADE

(71) Applicant: Moshe Levran, Fairfield, NJ (US)

(72) Inventor: Moshe Levran, Fairfield, NJ (US)

(73) Assignee: MLR INTERNATIONAL LLC, Fairfield, NJ (US)

( * ) Notice: Subject to any disclaimer, the term of this patent is extended or adjusted under 35 U.S.C. 154(b) by 0 days.

(21) Appl. No.: 14/667,716

(22) Filed: Mar. 25, 2015

Related U.S. Application Data (60) Provisional application No. 62/126,149, filed on Feb. 27, 2015.

(51) Int. Cl.
*E04H 17/16* (2006.01)
*E04H 17/18* (2006.01)
*E01F 13/02* (2006.01)
*B65G 57/09* (2006.01)

(52) U.S. Cl.
CPC ............ *E04H 17/18* (2013.01); *B65G 57/09* (2013.01); *E01F 13/022* (2013.01); *E04H 17/16* (2013.01); *E04H 17/168* (2013.01)

(58) Field of Classification Search
CPC ...... E01F 13/02; E01F 13/022; E04H 17/168; B65G 57/09; G09F 2007/1834; G09F 2007/1878; G09F 15/0037; G09F 15/0056; A01K 1/0029; A01K 1/0035; A47G 5/0068; G03B 21/58
USPC ....... 256/24, 26, 73; 404/6, 9; 160/135, 351; 40/606.01, 612
See application file for complete search history.

(56) References Cited

U.S. PATENT DOCUMENTS

| | | | | |
|---|---|---|---|---|
| 3,362,459 | A * | 1/1968 | Frank | A47H 21/00 160/135 |
| 5,031,683 | A * | 7/1991 | Marvy et al. | 160/351 |
| 6,199,833 | B1 * | 3/2001 | Bilby et al. | 256/24 |
| 6,257,559 | B1 * | 7/2001 | Mouri | 256/26 |
| 7,121,529 | B2 * | 10/2006 | Priefert | 256/24 |
| 7,234,275 | B1 * | 6/2007 | Haggy et al. | 52/71 |
| 7,540,682 | B1 * | 6/2009 | Christensen et al. | 404/6 |
| 7,789,585 | B2 * | 9/2010 | Christensen et al. | 404/6 |
| 8,387,955 | B2 * | 3/2013 | Ptacek et al. | 256/31 |
| 2002/0014619 | A1 * | 2/2002 | Christensen et al. | 256/25 |
| 2003/0197165 | A1 * | 10/2003 | Perelli | 256/26 |
| 2011/0031458 | A1 * | 2/2011 | Ben Simon | E01F 13/022 256/31 |
| 2012/0261632 | A1 * | 10/2012 | Bertucat | 256/26 |

FOREIGN PATENT DOCUMENTS

GB 2508637 A * 6/2014

* cited by examiner

*Primary Examiner* — Abigail Troy
*Assistant Examiner* — Nahid Amiri
(74) *Attorney, Agent, or Firm* — Law Offices of Mitchell P. Novick (57) ABSTRACT

A modular, movable, barricade which has, along its bottom edge, a one or more of supporting feet configured to allow stacking during storage and/or transport. Individual, similar barricade modules may be easily assembled into customized configurations for use by complementary attachment means along the side edges. After use, an assembled customized configuration may be easily disassembled into individual barricade modules by detaching the attachment means. The modules may then be stacked for storage and/or transport until further use.

8 Claims, 8 Drawing Sheets

STACKABLE, MODULAR BARRICADE

CROSS-REFERENCES TO RELATED APPLICATIONS

This application claims the benefit of United States Provisional application Ser. No. 62/126,149, filed Feb. 27, 2015, and whose contents are incorporated by reference herein in their entirety.

FIELD OF THE INVENTION

Embodiments of the present invention include movable barricades, and more specifically, modular, movable barricades.

BACKGROUND OF THE INVENTION

A common method of creating barricaded spaces or crowd control is by the use of movable barricades.

Movable barricades are used in a wide variety of applications. Some examples are:
Parks
Parking
Restaurant
Street Fairs
Carnivals
Construction Sites
Police Activities
Ski Resorts
Private Pools
Sports
Universities
Military
Concerts
Airports
Stadiums
Golf
Parties
Camps
Rental Companies
Malls
Casinos
Convention Centers
Theaters
Zoos; and
Other Events.

The barricades are often modular units, which can be configured as needed for each use. Typically, multiple barrier units are set up as needed and then moved away and stored until the next use.

In the prior art, such barricades are usually made of metal. However, metal barricades are heavy, hard to maneuver and set up, tend to rust/corrode, and take up a lot of space to store between uses.

Thus, it is desired to have a method and system for creating barricaded spaces or crowd control which overcome these prior art limitations.

BRIEF SUMMARY OF THE INVENTION

An object of the present invention is a modular, movable barricade that is stackable for storage purposes.

Another object of the present invention is a modular, movable barricade that is stackable for transport purposes.

Yet another object of the present invention is a modular, movable barricade that is lightweight.

Still another object of the present invention is a modular, movable barricade in which individual barricades are easily connected and disconnected from each other.

And another object of the present invention is a modular, movable barricade in which multiple individual barricades may be assembled into customized configurations.

An embodiment of the present invention is a modular, movable, barricade which has, along its bottom edge, a one or more of supporting feet configured to allow stacking during storage and/or transport. Individual, similar barricade modules may be easily assembled into customized configurations for use by complementary attachment means along the side edges. After use, an assembled customized configuration may be easily disassembled into individual barricade modules by detaching the attachment means. The modules may then be stacked for storage and/or transport until further use.

DESCRIPTION OF THE INVENTION

Embodiments of this invention comprise a modular movable barricade 1. (In this Specification, the embodiment is referred to interchangeably as a "barricade", a "module", or a "unit".) For one embodiment, typical dimensions of the barricade 1 may be approximately 78 inches long, 39.5 inches high, and 2 inches deep (excluding the unit's "feet"); however, for specific applications, the barricade unit 1 may have, and would preferably have, dimensions chosen for that specific application.

Preferably, the barricade 1 is made of plastic. Plastic allows for a more economical and lighter unit compared to a metal construction. Also, the plastic is preferably recyclable, such as polypropylene. This choice of plastic addresses ecological and environmental concerns about using the barricade modules 1.

Each barricade module 1 has built-in connecting mechanism components 2, 3 for connecting to other identical or very similar barricade modules 1. Along one side of the module 1 is a grabbing mechanism 2; on the opposite side of the module is a receiving mechanism 3. The grabbing mechanism 2 of one module 1 is connectable to the receiving mechanism 3 of an adjacent module 1, preferably by "snapping" it into place. Alternatively, the connecting mechanism components 2, 3 may be held together by a suitably shaped pin inserted into and between them. This connection method allows for rapidly, and flexibly creating barricaded areas to meet the users' needs.

Along the underside of the barricade module 1 are "feet" 4, 5 which extend generally perpendicularly from the body of the module 1. Each foot 4, 5 angles away and downward from the underside of the barricade 1. The feet 4, 5 have a cross section in which the top surface is complementary (opposite) to the bottom surface. For example, the feet 4, 5 may be flat, have an arc-shaped cross section, or a trapezoidal-shaped cross section.

These feet 4, 5 support and maintain the module 1 in a vertical position during use. These feet 4, 5 are integral to the module and are also preferably made of plastic. Preferably, the feet 4, 5 are created along with the creation of the module 1, for example, by a molding process. Thus, the entire module 1 has a single piece construction for additional strength.

The feet 4, 5 are arranged in pairs. In each pair, one foot 4 extends outward from the body of the module 1 in one direction and the other foot 5 extends outward from the body of the module 1 in the opposite direction.

By way of example only, for one embodiment, the feet 4, 5 are preferably tapered with a maximum width (at the connection to the body of the module 1) of approximately 4 inches. The span from the tip of one foot 4 to the tip of the other foot 5 in the pair is approximately 20 inches; however, for specific applications, the barricade unit 1 may have, and would preferably have, feet 4, 5 with dimension chosen for that specific application.

The feet 4, 5 in each pair are preferably placed in a staggered arrangement. Further, the feet 4, 5 in each pair are preferably shaped so that the "front" foot 4b of a second module 1b can be placed under the corresponding "front" foot 4a of a first module 1a while at the same time, the "back" foot 5b of that second module 1b can be placed over the corresponding "back" foot 5a of that first module 1a (see FIGS. 17 and 18). Thus, the combination of stagger and shape allow multiple modules 1a, 1b to be stacked closely together during transport and storage.

Preferably, there are two sets of feet 4, 5 for each module 1, located closer to the ends of the module 1 than to each other. However, other numbers and arrangement of pairs of feet 4, 5 may be chosen for specific applications.

In another embodiment of this invention, the barricades 1 may be customized, during or after manufacture, with one or more colors and/or with information desired by the user. Also, signs may be attached to the barricades 1 in varying colors and/or with such information. Examples of such information include without limitation:
 name
 trademark
 logo
 website
 sponsors
 supporters; and
 advertisers.
Individual modules 1 may be mixed and matched with different colors and such information.

In use, barrier modules 1 as needed are taken from storage and connected together in a desired arrangement. During use, the modules 1 may be easily separated and reconnected in another desired arrangement. When the need for the barricade arrangement is complete, the modules 1 are separated, stacked together, and stored compactly.

Figure 1:
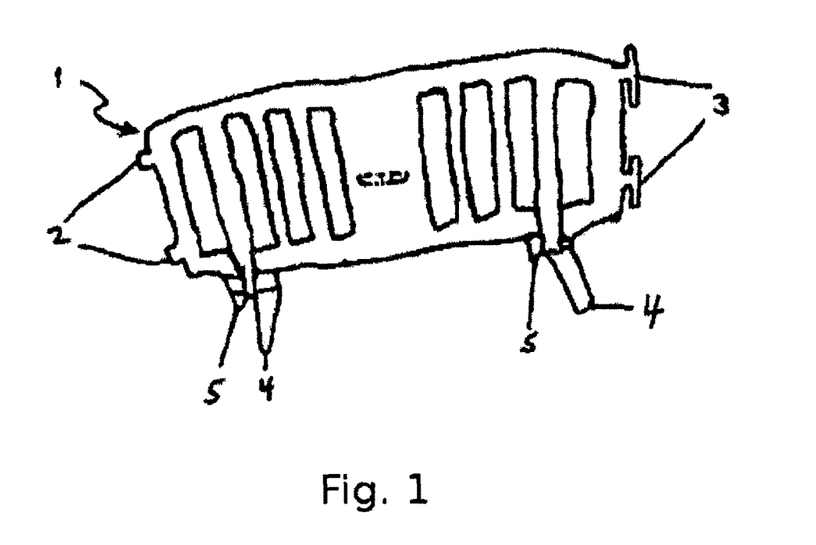
FIG. 1 is a front view of an embodiment of the invention.
Figure 2:
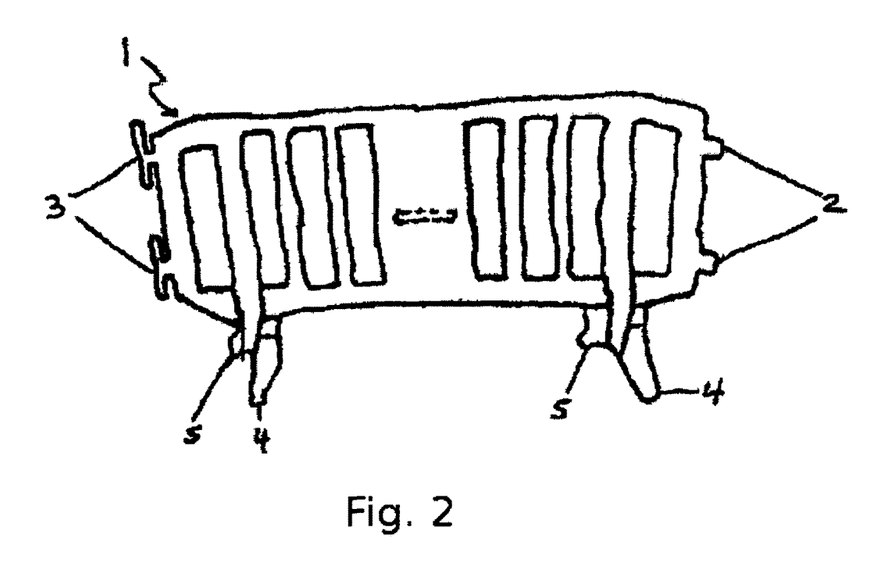
FIG. 2 is a front view of another embodiment of the invention.
Figure 3:
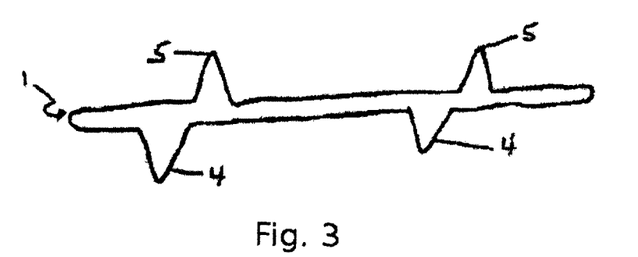
FIG. 3 is a top view of the embodiment shown in FIG. 1.
Figure 4:
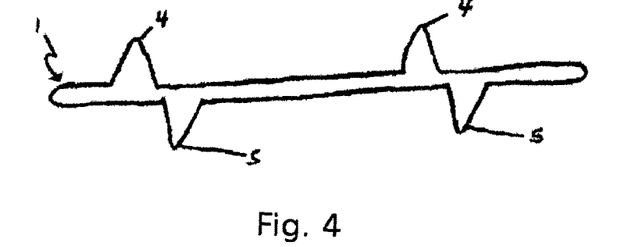
FIG. 4 is a bottom view of the embodiment shown in FIG. 1.
Figure 5:
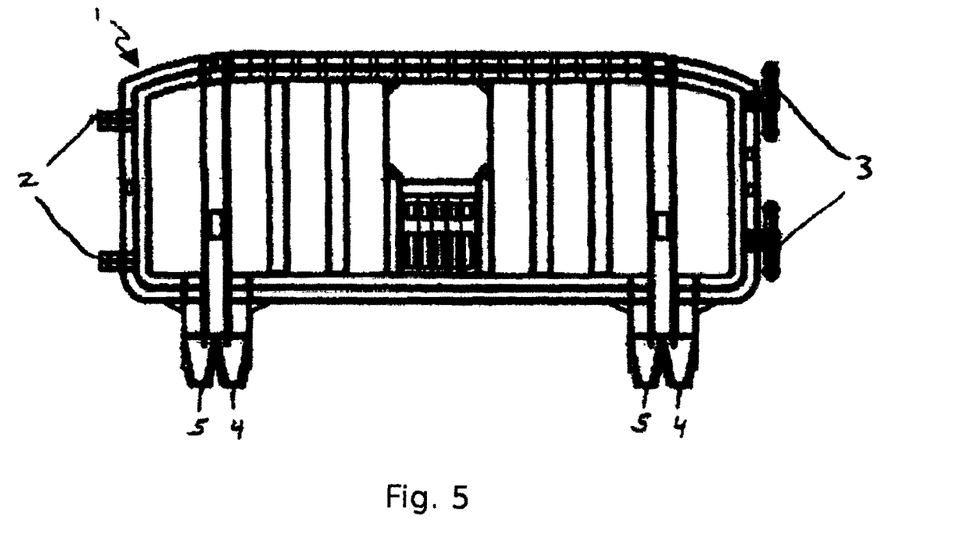
FIG. 5 is a front view schematic of the embodiment shown in FIG. 1.
Figure 6:
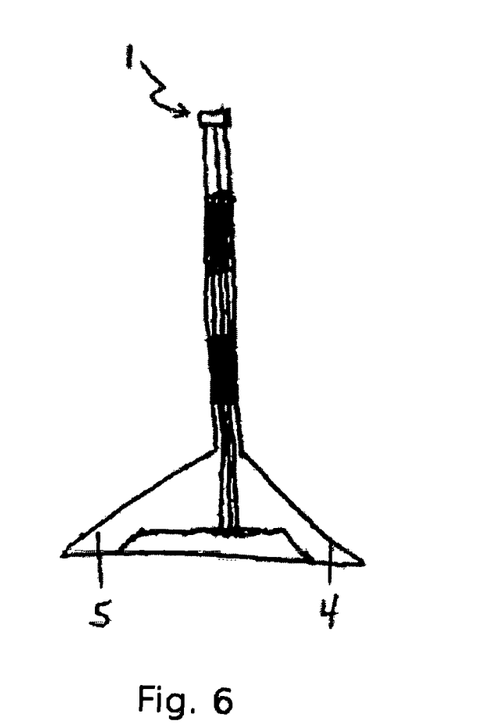
FIG. 6 is a side view schematic of the embodiment shown in FIG. 1.
Figure 7:
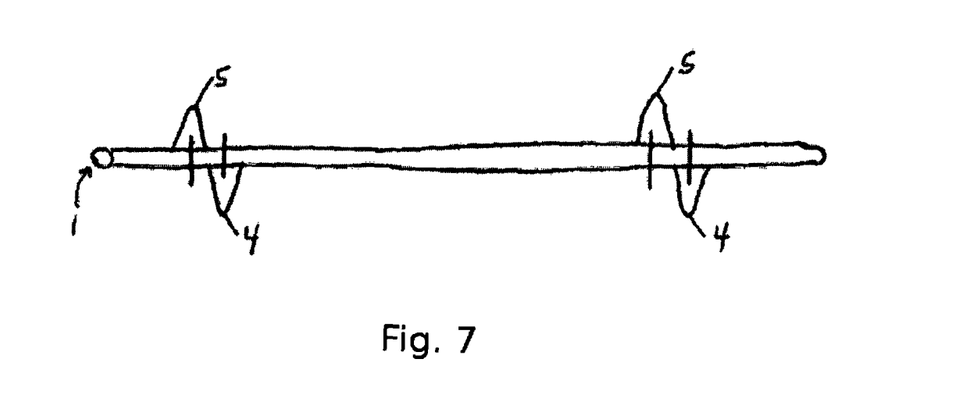
FIG. 7 is a top view schematic of the embodiment shown in FIG. 1.
Figure 8:
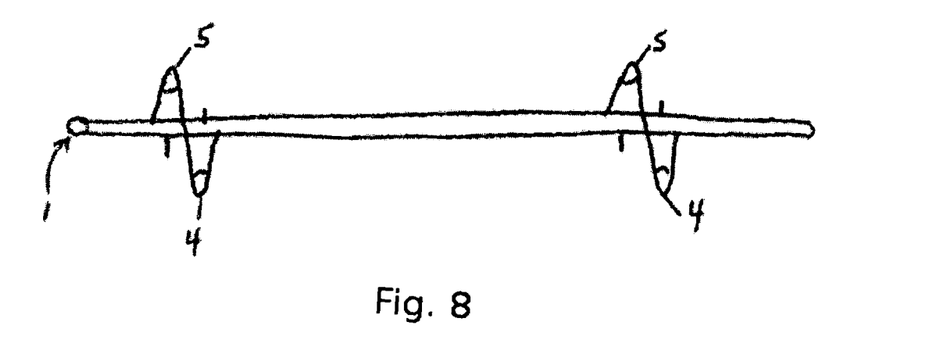
FIG. 8 is a bottom view schematic of the embodiment shown in FIG. 1.
Figure 9:
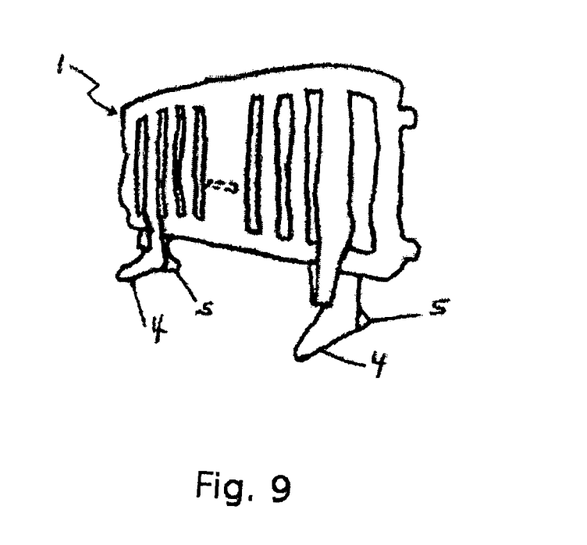
FIG. 9 is an angular front view of the embodiment shown in FIG. 1.
Figure 10:
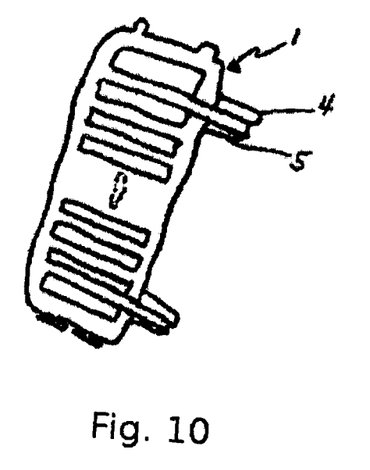
FIG. 10 is an angular bottom view of the embodiment shown in FIG. 1.
Figure 11:
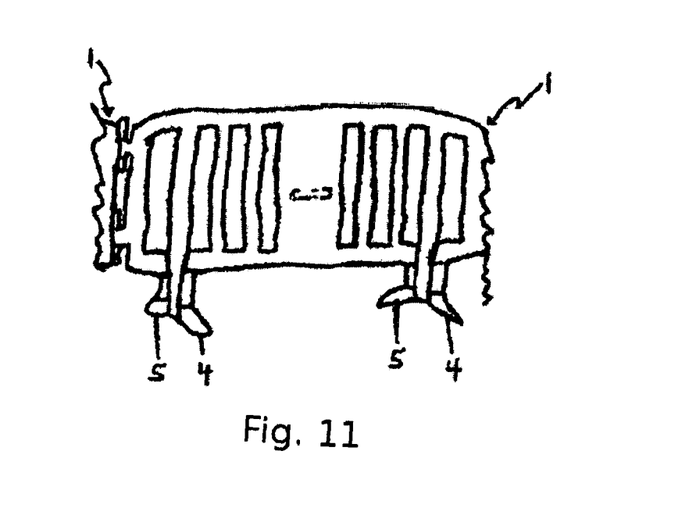
FIGS. 11-14 show multiple units of the embodiment shown in FIG. 1 connected together.
Figure 12:
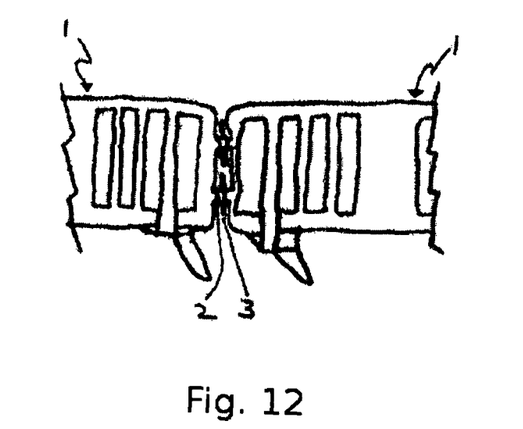
Figure 13:
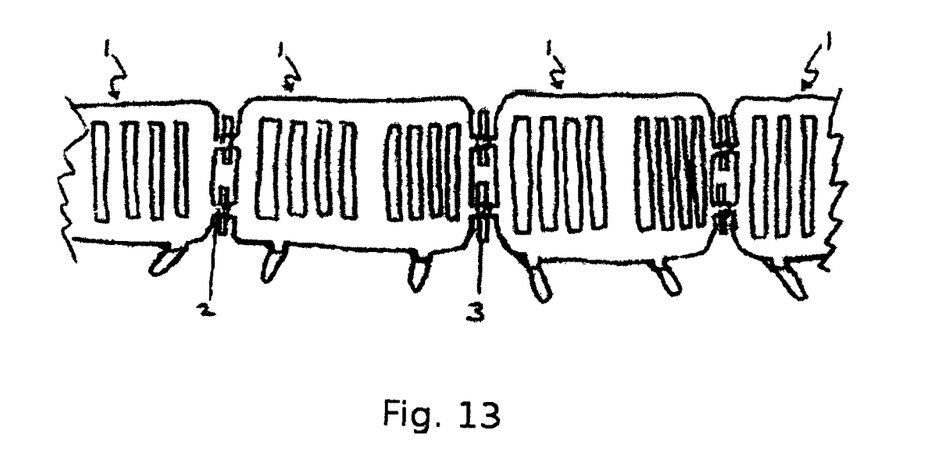
Figure 14:
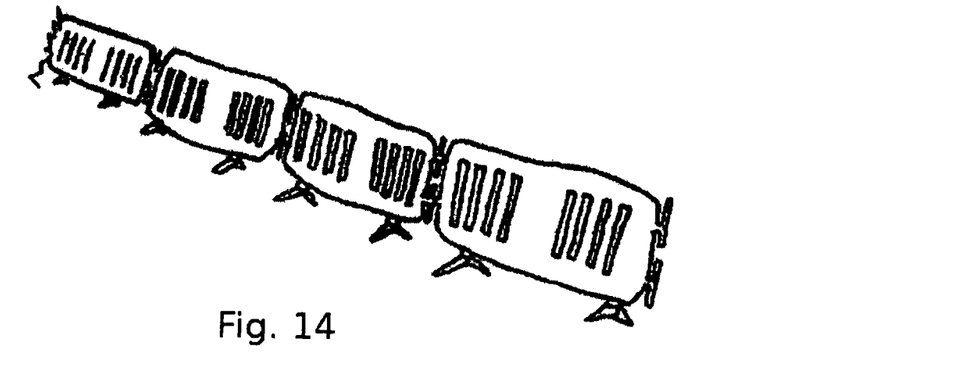
Figure 15:
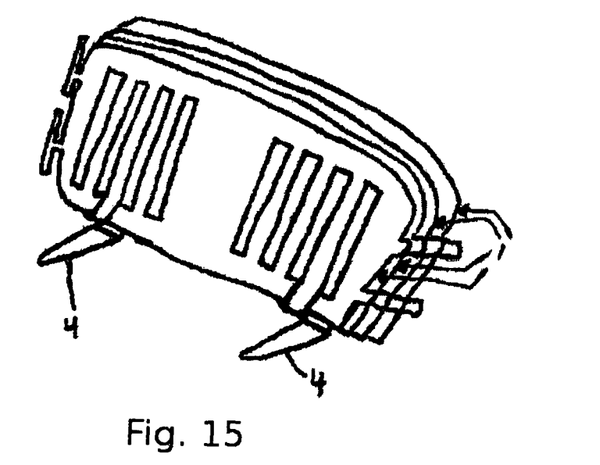
FIGS. 15-16 show multiple units of the embodiment shown in FIG. 1 in a stacked configuration.
Figure 16:
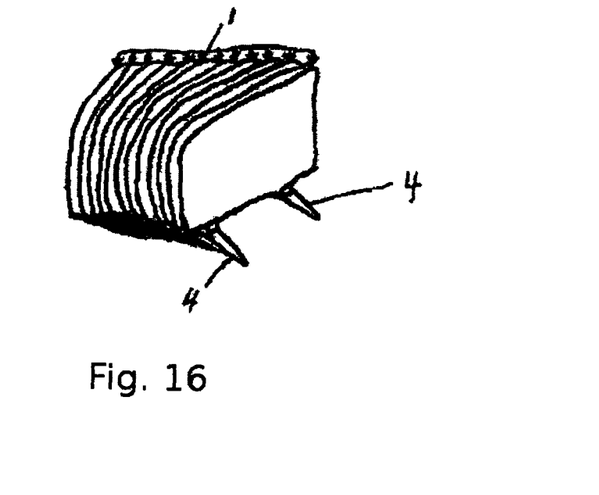
Figure 17:
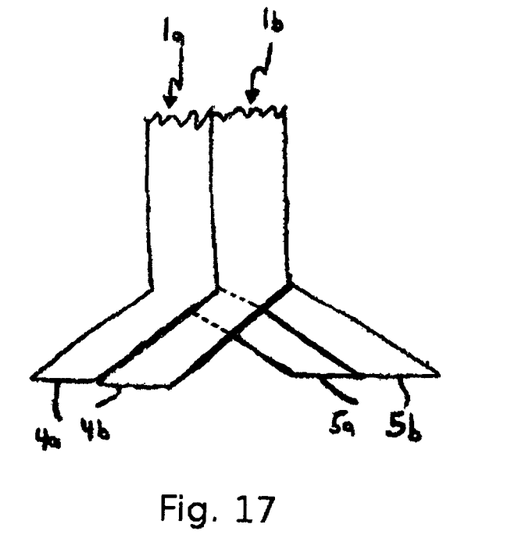
FIG. 17 shows the foot portions of two units of the embodiment shown in FIG. 1 in stacked configuration.
Figure 18:
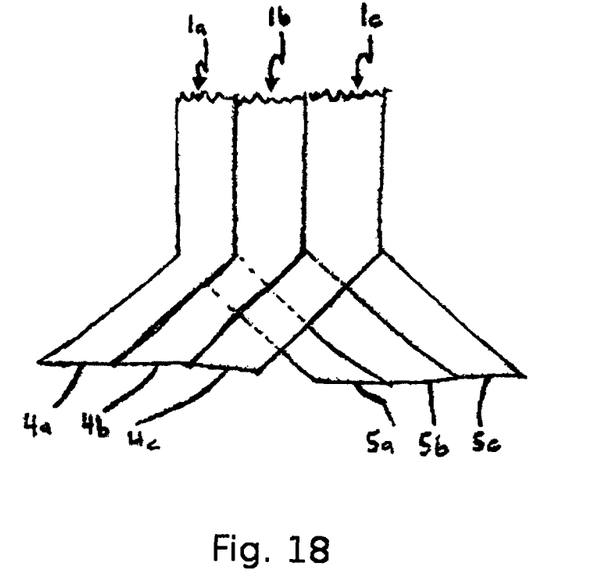
FIG. 18 shows the foot portions of three units of the embodiment shown in FIG. 1 in stacked configuration.

Stacking is accomplished by placing the "front" foot 4b of a second module 1b under the corresponding "front" foot 4a of a first module 1a while at the same time, placing the "back" foot 5b of that second module 1b over the corresponding "back" foot 5a of that first module 1a and pushing the two modules 1a, 1b together (see FIG. 17). Stacking continues by placing the "front" foot 4c of a third module 1c under the corresponding "front" foot 4b of that second module 1b while at the same time, placing the "back" foot 5c of that third module 1c over the corresponding "back" foot 5b of that second module 1b and pushing that third module 1c next to the first and second modules 1a, 1b. This process is repeated until all desired modules 1 are stacked and closely positioned together. Thus, combination of stagger and shape of the feet allows multiple modules 1 to be stacked closely together during transport and storage.

Thus, this invention overcomes the limitations of the prior art barricades with a functionally designed modular barricade 1 which is durable, lightweight, strong, versatile, easy to store, easy to handle, does not rust, pleasing in appearance, customizable, and ecologically/environmentally sensitive. The modules 1 preferably have one-piece construction allowing for stronger units 1 with no weak points. Further, the modules 1 are quick interlocking units. Finally, the modules 1 are stackable for compact storage.

Therefore, although this invention has been described with a certain degree of particularity, it is to be understood that the present disclosure has been made only by way of illustration and that numerous changes in the details of construction and arrangement of parts may be resorted to without departing from the spirit and scope of the invention.

What is claimed is:

1. A barricade comprising:
 a frame having a top edge, a left edge, a right edge, and a bottom edge;
 the bottom edge having a front side and a back side opposite the front side, the bottom edge being generally disposed along an axis; and
 a first support and a second support, each support proximate to the bottom edge and positioned generally perpendicular to the bottom edge, each support being non-removably and non-rotatably attached to the frame, each support comprising:
  a front foot extending generally perpendicularly outward from the front side of the bottom edge;
  a back foot extending generally perpendicularly outward from the back side of bottom edge and opposite from the front foot; and
  the front foot being offset along the axis from the back foot; and
 the first support and the second support being in a generally parallel orientation to each other.

2. The barricade as described in claim 1, further comprising:
 first attachment means proximate to the left edge; and
 second attachment means proximate to the right edge;
 the first attachment means being detachably attachable to the second attachment means on a second barricade of similar structure as the barricade.

3. A barricade system comprising a plurality of barricades, each of the barricades comprising:

a frame having a top edge, a left edge, a right edge, and a bottom edge;

the bottom edge having a front side and a back side opposite the front side, the bottom edge being generally disposed along an axis; and a first support and a second support, each support proximate to the bottom edge and positioned generally perpendicular to the bottom edge, each support being non-removably and non-rotatably attached to the frame, wherein each support of each of the barricades comprises:

a front foot extending generally perpendicularly outward from the front side of the bottom edge;

a back foot extending generally perpendicularly outward from the back side of bottom edge and opposite from the front foot; and the front foot being offset along the axis from the back foot;

the front foot of the support of a first barricade of the barricades being positionable next to the front foot of the support of a second barricade of the barricades;

the back foot of the support of the first barricade being positionable next to the back foot of the support of the second barricade; and the first support and the second support being in a generally parallel orientation to each other.

4. The barricade system as described in claim 3, wherein each of the barricades further comprises:

first attachment means proximate to the left edge; and second attachment means proximate to the right edge;

the first attachment means of a first barricade of the barricades being detachably attachable to the second attachment means of a second barricade of the barricades.

5. The barricade system as described in claim 3 wherein:

the front foot of each support of the second barricade is positionable under the front foot of the corresponding support of the first barricade;

while generally contemporaneously the back foot of each support of the second barricade is positionable over the back foot of the corresponding support of the first barricade.

6. The barricade system as described in claim 3 wherein:

the front foot of each support of the first barricade is positionable over the front foot of the corresponding support of the second barricade;

while generally contemporaneously the back foot of each support of the first barricade is positionable under the back foot of the corresponding support of the second barricade.

7. A barricade comprising:

a frame having a top edge, a left edge, a right edge, and a bottom edge;

the bottom edge having a front side and a back side opposite the front side, the bottom edge being generally disposed along an axis; and a first support and a second support, each support proximate to the bottom edge and positioned generally perpendicular to the bottom edge, each support comprising:

a front foot extending generally perpendicularly outward from the front side of the bottom edge, the front foot having a front foot bottom;

a back foot extending generally perpendicularly outward from the back side of bottom edge and opposite from the front foot, the back foot having a back foot bottom; and the front foot being offset along the axis from the back foot, such that the front foot of each support of the barricade is positionable under a front foot of the corresponding support of a second barricade, so that the front foot bottom of the barricade and a front foot bottom of the second barricade are generally coplanar;

while generally contemporaneously, the back foot of each support of the barricade is positionable over a back foot of the corresponding support of a third barricade, so that the back foot bottom of the barricade and a back foot bottom of the third barricade are generally coplanar.

8. The barricade as described in claim 7, further comprising:

first attachment means proximate to the left edge; and second attachment means proximate to the right edge;

the first attachment means being detachably attachable to the second attachment means on a second barricade of similar structure as the barricade.

\* \* \* \* \*